(12) United States Patent
Miller et al.

(10) Patent No.: US 7,359,860 B1
(45) Date of Patent: Apr. 15, 2008

(54) CALL FLOW OBJECT MODEL IN A SPEECH RECOGNITION SYSTEM

(75) Inventors: Edward S. Miller, San Diego, CA (US); Kyle N. Danielson, San Diego, CA (US); James F. Blake, II, San Diego, CA (US); Michael D. Bergman, Poway, CA (US); Sidney Schipper, San Diego, CA (US)

(73) Assignee: Lumen Vox, LLC, San Diego, CA (US)

( * ) Notice: Subject to any disclaimer, the term of this patent is extended or adjusted under 35 U.S.C. 154(b) by 846 days.

(21) Appl. No.: 10/789,397

(22) Filed: Feb. 27, 2004

Related U.S. Application Data

(60) Provisional application No. 60/451,353, filed on Feb. 27, 2003.

(51) Int. Cl.
*G10L 15/00* (2006.01)
(52) U.S. Cl. .............. 704/275; 704/270; 379/88.05
(58) Field of Classification Search ............ 704/270, 704/275; 379/88.05, 88.1
See application file for complete search history.

(56) References Cited

U.S. PATENT DOCUMENTS

| | | | |
|---|---|---|---|
| 5,384,892 A | 1/1995 | Strong | |
| 5,390,278 A | 2/1995 | Gupta et al. | |
| 5,615,296 A | 3/1997 | Stanford et al. | |
| 5,649,057 A | 7/1997 | Lee et al. | |
| 5,719,921 A | 2/1998 | Vysotsky et al. | |
| 5,774,628 A | 6/1998 | Hemphill | |
| 5,867,817 A | 2/1999 | Catallo et al. | |
| 6,006,185 A | 12/1999 | Immarco | |
| 6,173,266 B1 * | 1/2001 | Marx et al. | 704/270 |
| 6,263,308 B1 | 7/2001 | Heckerman et al. | |
| 6,298,324 B1 | 10/2001 | Zuberec et al. | |
| 6,321,198 B1 * | 11/2001 | Hank et al. | 704/270 |
| 6,377,921 B1 | 4/2002 | Bahl et al. | |
| 6,975,985 B2 | 12/2005 | Kriechbaum et al. | |
| 2002/0095295 A1 | 7/2002 | Cohen et al. | |
| 2002/0136378 A1 | 9/2002 | Strubbe et al. | |
| 2002/0193990 A1 | 12/2002 | Komatsu | |
| 2005/0091057 A1 * | 4/2005 | Phillips et al. | 704/270.1 |

* cited by examiner

*Primary Examiner*—Daniel Abebe
(74) *Attorney, Agent, or Firm*—Knobbe Martens Olson & Bear LLP

(57) ABSTRACT

Systems and methods are provided for embodiments of a speech recognition system call flow object model. The systems and methods organize and execute, for example, multiple question directed dialogs, overview dialogs, or natural language directed dialogs. In certain embodiments, the organizing and executing of the natural language directed dialogs uses primary and secondary concepts without requiring a structured response. The systems and methods enable the call flow designers to define particular call flows without requiring the designers to perform any programming or coding.

9 Claims, 8 Drawing Sheets

CALL FLOW OBJECT MODEL IN A SPEECH RECOGNITION SYSTEM

RELATED APPLICATIONS

This application claims the benefit under 35 U.S.C. § 119(e) of U.S. Provisional Application No. 60/451,353, filed Feb. 27, 2003 and titled "CALL FLOW OBJECT MODEL IN A SPEECH RECOGNITION SYSTEM," which is hereby incorporated by reference. This application is related to U.S. application Ser. No. 10/317,837, filed Dec. 10, 2002 and titled "SPEECH RECOGNITION SYSTEM HAVING AN APPLICATION PROGRAM INTERFACE," which is hereby incorporated by reference.

BACKGROUND OF THE INVENTION

1. Field of the Invention

The invention relates to speech recognition technology. More particularly, the invention relates to systems and methods for a speech recognition system having a call flow object model.

2. Description of the Related Technology

Speech recognition, also referred to as voice recognition, generally pertains to the technology for converting voice data to text data. Typically, in speech recognition systems the task of analyzing speech in the form of audio data and converting it to a digital representation of the speech is performed by an element of the system referred to as a speech recognition engine. Traditionally, the speech recognition engine functionality has been implemented as hardware components, or by a combination of hardware components and software modules. More recently, software modules alone perform the functionality of speech recognition engines. The use of software has become ubiquitous in the implementation of speech recognition systems in general and more particularly in speech recognition engines.

Current speech recognition systems require a call flow designer to generate computer code to implement and modify a particular call flow design that is desired by the designer. The writing of program code requires the designer to be very knowledgeable and highly skilled in computer programming and in call flow design of speech recognition systems. Thus, the number of people available that are qualified to perform the call flow programming is limited, and the cost of designing the call flow is very high.

Therefore, what is needed is a speech recognition system that implements a call flow object model that enables the call flow designer to implement and modify a particular call flow design without the designer having to write program code or have a detailed understanding of the internal workings of the speech recognition system.

SUMMARY OF CERTAIN INVENTIVE ASPECTS

Certain embodiments of the invention include a method of designing a call flow in a speech recognition system, the method comprising organizing and utilizing a multiple question directed dialog in the speech recognition system, organizing and utilizing a natural language directed dialog in the speech recognition system, and organizing and utilizing an overview dialog in the speech recognition system.

Some embodiments include the method wherein the natural language directed dialog uses a primary concept and a secondary concept. Also included is the method wherein the natural language directed dialog uses a primary concept and a secondary concept without requiring a structured response.

Certain embodiments include a speech recognition system having a plurality of modules for implementing a call flow, the speech recognition system comprising at least one global module defining concepts that are available to the caller in a plurality of places in a call flow, and at least one user-defined module that processes at least a portion of the call flow.

Some embodiments include the speech recognition system wherein the user-defined module is a list module, wherein the list module is a standard caller input module. Also included is the speech recognition system wherein the user-defined module is a natural language module having primary and secondary responses to process natural language input from the caller. Further included is the speech recognition system wherein the user-defined module is an overview module that continues after an interruption in the call flow where the interruption occurred. Still further is the speech recognition system wherein the user-defined module is a multilevel module that allows multiple questions to be asked by a caller in the same module.

Some embodiments of the speech recognition system further comprise an execution chain that provides actions that are performed in response to input by a caller. Also included is the speech recognition system wherein the execution chain is a main execution chain. Further included is the speech recognition system wherein the execution chain is one or more of the following: a no match execution chain, a no input execution chain, an error execution chain, a response execution chain, a confirmation execution chain.

Certain embodiments include a speech recognition system, comprising a plurality of call flow modules, each module comprising execution chains and grammars, and wherein the modules can have one of a plurality of types, the types including multilevel allowing multiple questions to be asked and linking appropriate grammars to questions in multiple execution chains.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

DETAILED DESCRIPTION OF CERTAIN EMBODIMENTS

The following detailed description of certain embodiments presents various descriptions of specific embodiments of the present invention. However, the present invention can be embodied in a multitude of different ways. In this description, reference is made to the drawings wherein like parts are designated with like numerals throughout.

In certain embodiments, an automated call engine refers to a computer with a telephony card that answers incoming calls. A directed dialog may refer to an element of a call flow. Typically the caller is asked a question or presented a list of choice. The caller typically responds by repeating back the choice to the automated call engine. The call flow may refer to the tree of directed dialogs that a caller moves through on the automated call engine. Natural language may refer to the ability of a caller to respond to a directed dialog by using a sentence that must be parsed and interpreted.

In some embodiments, C++ object templates represent elements of a speech recognition system call flow. The way in which the elements are organized and executed allows unique methods of achieving, for example, a multiple question, overview and natural language directed dialog behavior. In addition, the multiple level question dialog allows multiple related questions to be asked of the caller without defining separate directed dialogs for each possibility.

Certain embodiments of an overview dialog play messages to the caller giving some form of overview or summary. The caller may ask a question and the system replies and continues giving the summary where it left off.

Embodiments of the natural language dialog allow primary and secondary concepts to be defined. An example of a primary concept is locations "downtown" and "north county". The secondary concepts for each could be, for example, "directions" and "store hours". A caller may state "I would like the store hours for the downtown location." The recognition engine picks out the key words and applies a score to each primary and secondary concept pair defined. The pair with the highest score may be given as the caller response.

Figure 1:
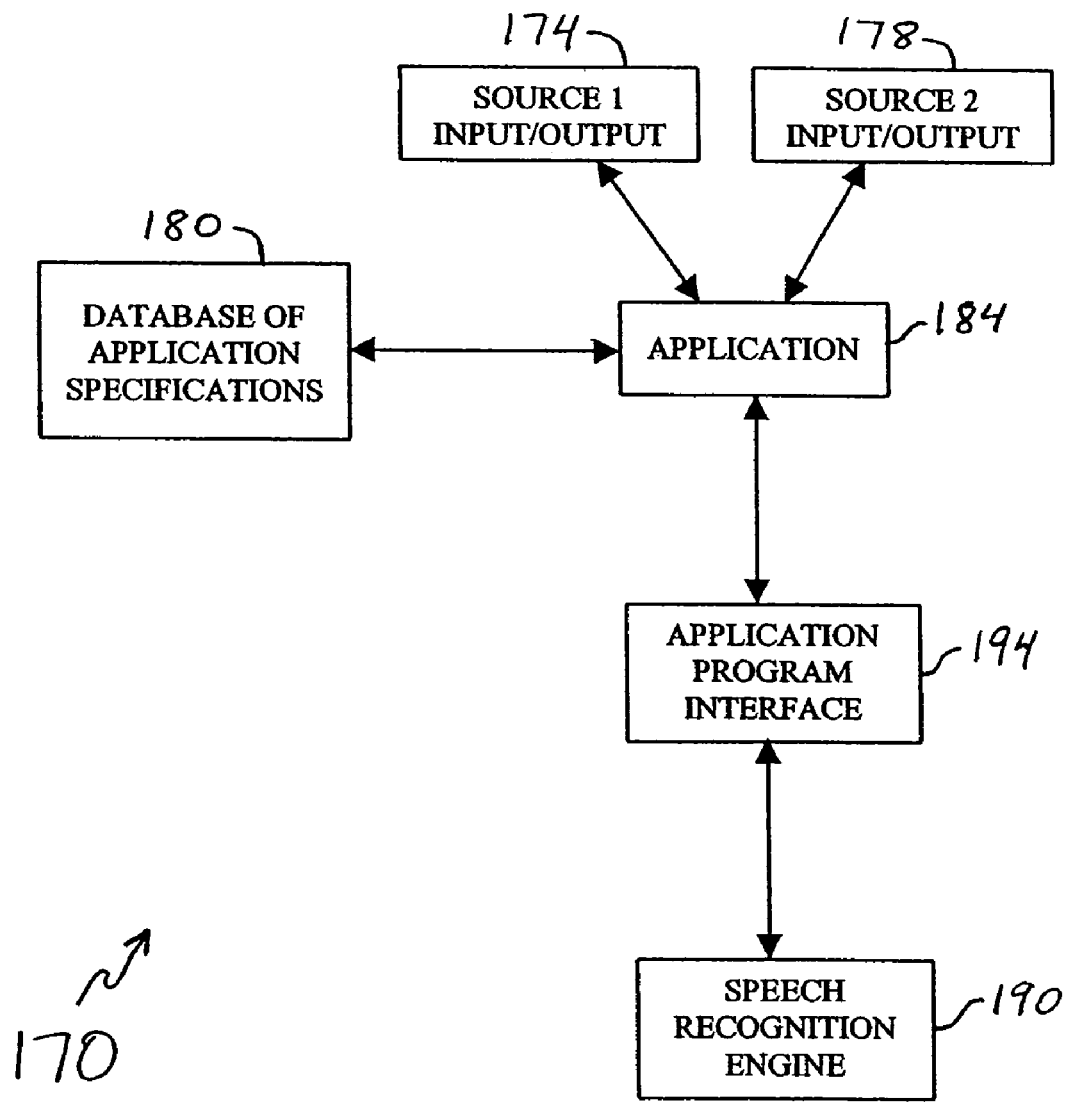
FIG. 1 is a top-level diagram of certain embodiments of a speech recognition system configuration in which a call flow object model operates in a speech recognition engine (SRE).

Referring now to the figures, FIG. 1 is a top-level diagram of certain embodiments of a speech recognition system 170 configuration in which a call flow object model operates in a speech recognition engine (SRE). In these embodiments, the speech recognition system 170 includes an application 184, which may be one or more modules that customize the speech recognition system 170 for a particular application or use. The application 184 can be included with the speech recognition system 170 or can be separate from the speech recognition system 170 and developed and provided by the user or programmer of the speech recognition system 170. In certain embodiments, the call flow object model is incorporated into the one or more modules of the application 184. In other embodiments, the call flow object model may be implemented by incorporating it into other modules or applications.

In this embodiment, the speech recognition system 170 includes input/output audio sources, shown in FIG. 1 as a source 1 input/output 174 and a source 2 input/output 178. While two audio sources are shown in FIG. 1, the speech recognition system 170 may have one or a multiplicity of input/output audio sources. In addition, the audio source may be of various types, e.g., a personal computer (PC) audio source card, a public switched telephone network (PSTN), integrated services digital network (ISDN), fiber distributed data interface (FDDI), or other audio input/output source. Some embodiments of the speech recognition system 170 also include a database of application specifications 180 for storing, for example, grammar, concept, phrase format, vocabulary, and decode information. The objects and other data items saved by and comprising the call flow object model may be stored within the database of application specifications 180, or alternatively may be stored in other storage devices such as electronic memory devices, hard disks, floppy disks, CD-ROMs, DVDs, or the like.

The speech recognition system 170 additionally includes a speech recognition engine (SRE) 190. The functions of the SRE include processing spoken input and translating it into a form that the system understands. The application 184 can then either interpret the result of the recognition as a command or handle the recognized audio information. The speech recognition system 170 additionally includes a speech recognition engine application program interface (API) 194, or speech port API, to enable the programmers or users to easily interact with the speech recognition engine 190.

Figure 2:
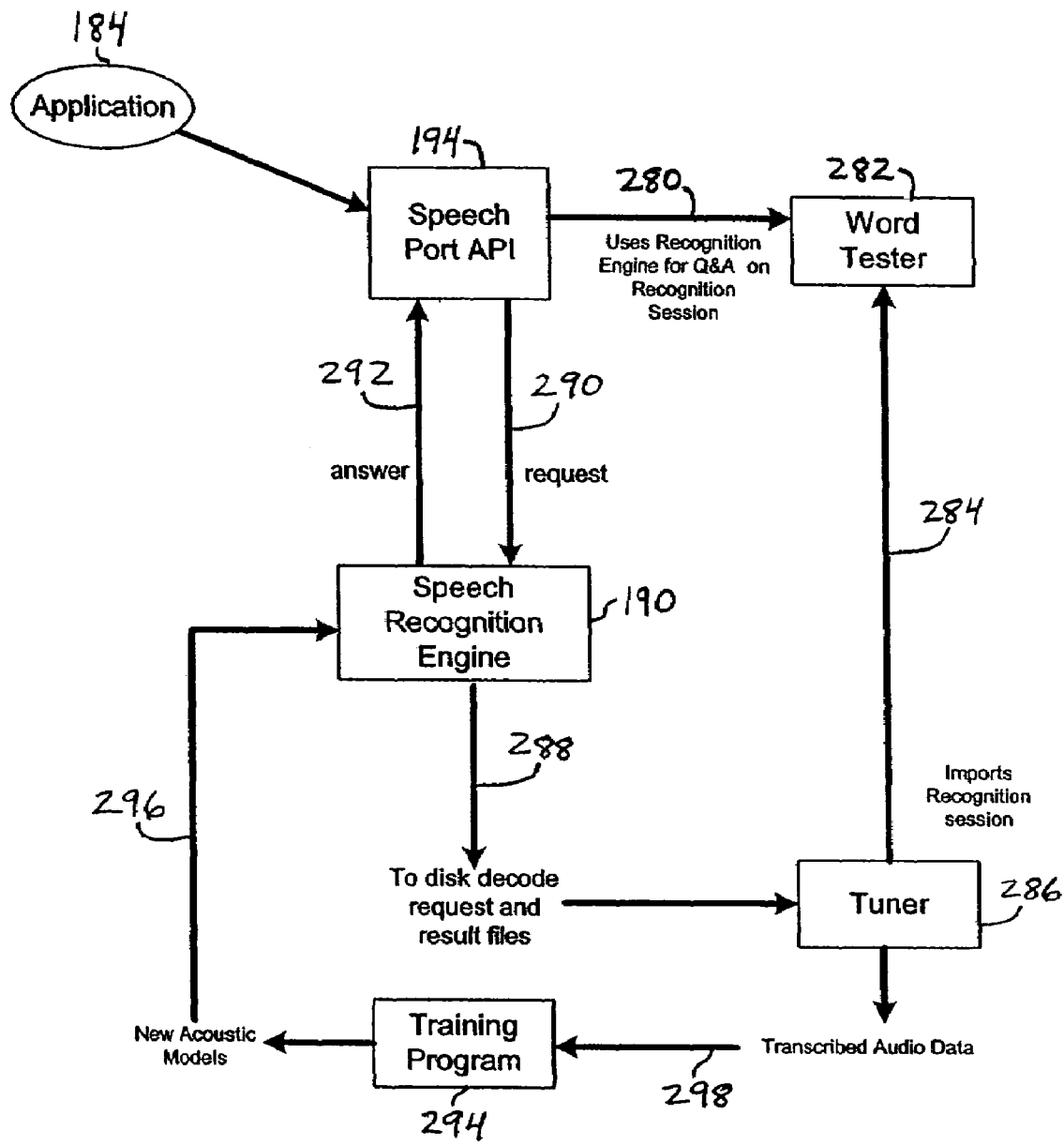
FIG. 2 is a diagram of certain embodiments of the speech recognition engine configuration illustrating the connectivity of various SRE components.

FIG. 2 is a diagram of certain embodiments of the speech recognition engine 190 configuration illustrating the connectivity of various SRE components. The application 184 is shown in FIG. 2 as an oval to illustrate that in this embodiment the application 184 is not integral to the SRE 190 but is developed and provided by the user of the system 170. In this embodiment, the user-developed application 184 interacts with the speech port API 194. The speech port API 194 interacts with a word tester module 282 as illustrated by an arrow 280 in FIG. 2, e.g., for invoking the speech recognition engine for questions and answers (Q&A) on the recognition session. The speech port API 194 interacts with the speech recognition engine module 190, e.g., for communicating a request to decode audio data as illustrated by an arrow 290 in FIG. 2, and for receiving an answer to the decode request as illustrated by an arrow 292.

The word tester module 282 also interacts with a tuner module 286, e.g., for receiving from the tuner module 286 information regarding a recognition session as illustrated by an arrow 284. The tuner module 286 additionally receives from the speech recognition engine 190 information regarding the disk decode request and result files as illustrated by an arrow 288. The tuner 286 interacts with a training program module 294, e.g., for communicating the transcribed audio data to the training program 294 as illustrated by an arrow 298 in FIG. 2. The training program 294 also interacts with the speech recognition engine 190, e.g., transferring the new acoustic model information to the speech recognition engine 190 as indicated by an arrow 296.

Figure 3:
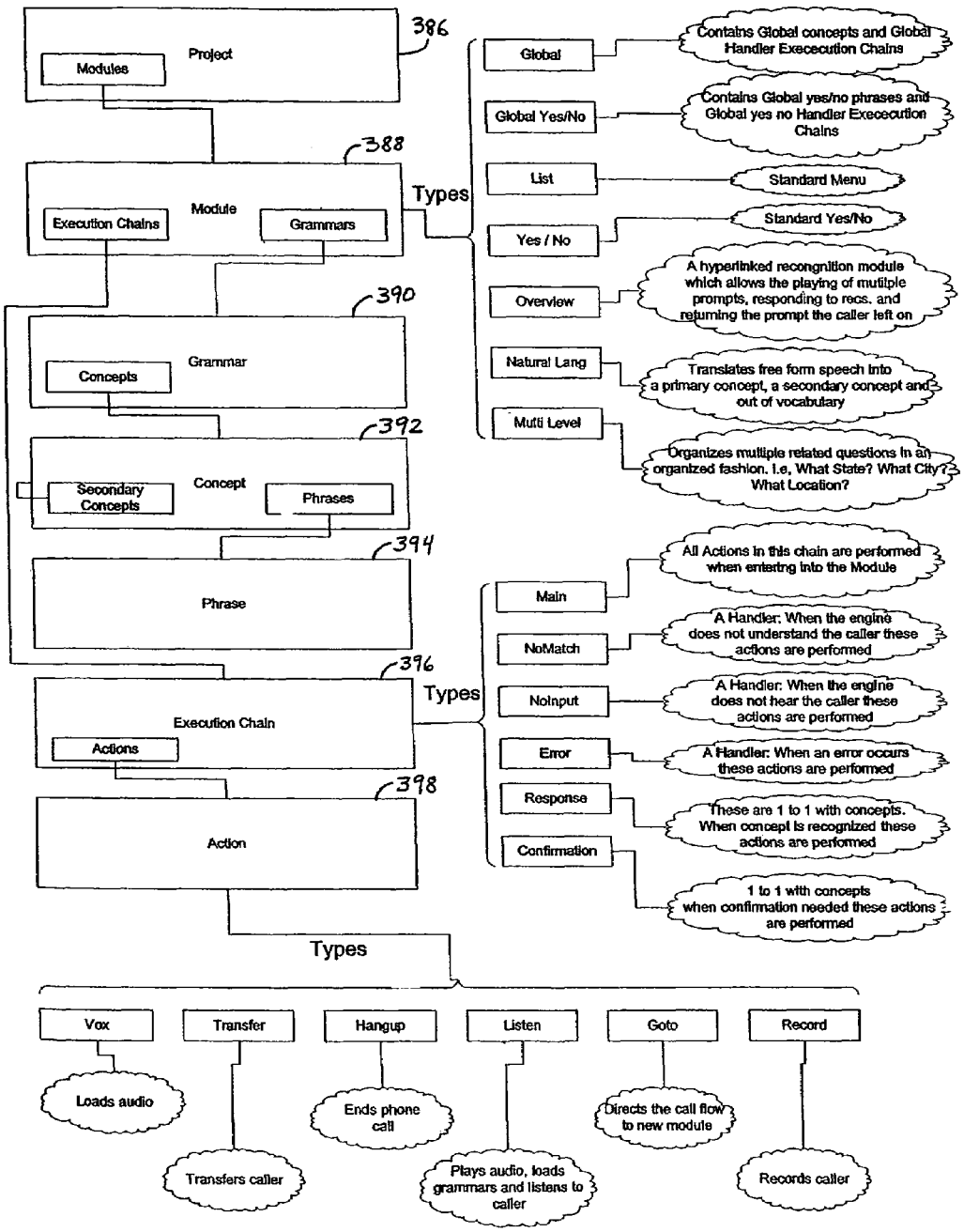
FIG. 3 is a diagram of certain embodiments of various components and types of the call flow object model.

FIG. 3 is a diagram of certain embodiments of various components and types of the call flow object model. A project object 386 is the container for the call flow elements. Each project can contain one or more global modules and one or more user defined modules. In addition, an audio library and properties may be contained in the project object 386. A module object 388 represents the elements needed to resolve a specific part of a conversation.

The module object 388 can contain one or more execution chain objects 396 and additionally may contain one or more grammar objects 390 as shown in FIG. 3. Each grammar object 390 can contain the phrases 394 to handle the predicted responses from the caller. A grammar object 390 can contain one or more vocabulary items. A vocabulary item represents one or more possible responses from a caller.

A vocabulary item may have one primary concept and may have one or more secondary concepts.

Each concept 392 represents the core idea a caller is trying to convey through speaking or pressing the touch tone or dual tone multi-frequency (DTMF) buttons. A concept 392 can contain one or more phrases 394. A phrase 394 is the predicted input of a caller. This can be represented by speech, text, numbers or DTMF (numbers). A phrase 394 typically contains no other object.

Each execution chain object 396 can contain one or more actions 398, which are designed to handle a specific event. Each action 398 may have an effect on the call flow the caller is moving through. An action 398 typically contains no other objects. As shown in the embodiment of FIG. 3, various actions 398 are possible, for example, vox, transfer, hangup, listen, goto and record. Of course, other desired actions may also be implemented and available for use by the call flow designer.

In some embodiments, the vox action plays audio to a caller. One purpose of the audio is to provide information to the caller or elicit a response from the caller. The goto action directs the call flow to a new module. The listen action indicates that it is time to receive input from the caller and also identifies which grammar to use for interpretation. The transfer action contains the transfer string to move the call out of the system and to a new location (e.g., module). The hangup action marks where to end the call. The record action records a response from a caller.

In certain embodiments, the actions are terminal except the vox action. In other words, a terminal action is the last action in the chain. This is due to the fact that this action performs its function and the call then progresses in a new direction, by entering a new module or execution chain 396. An execution chain object 396 may be a collection of actions. Each module 388 typically contains at least one execution chain 396 to aid the module 388 in producing a desired response from the caller or deliver some desired information to the caller. In embodiments as shown in FIG. 3, the execution chain object 396 has one of a plurality of types, for example, a main type, a no match type, a no input type, an error type, a response type, and a confirmation type. Of course, more or fewer types of execution chains may be implemented, and other types may be implemented that are not shown in the illustrative example of FIG. 3.

The main execution chain contains the primary actions to achieve the desired result of the module. Actions allowed include vox, and one other depending on module type. When the main chain fails to elicit a response from the caller, the no input chain's actions can be designed to encourage a response, move the caller along in the call flow or transfer a caller to another agent. Each module can contain one or more no input execution chains. Multiple no input chains may execute sequentially, with each one executing once and the last one executing one or more times. In embodiments with, for example, three no input chains, the first one may be executed the first time the caller does not respond, the second the second time and the third may be executed repeatedly for each no input thereafter. Actions allowed may include, for example, vox, goto, transfer or hang up.

An additional type of execution chain 396 is a no match execution chain. For instance, if the caller responds but the response could not be interpreted, the no match actions can be designed to further clarify how the caller needs to respond. A module can contain one or more no match chains. Multiple no match chains are executed sequentially in the same fashion as the multiple no input chains described above. Actions allowed may include, for example, vox, goto, transfer or hangup.

A further type of execution chain 396 is an error execution chain. If a program error has occurred, the actions in this chain can be designed to be a failsafe. Actions allowed include, for example, vox, goto, transfer or hangup. Another type of execution chain is a response execution chain. Each concept may have a corresponding response chain. The response chain can contain the appropriate actions to perform in response to the callers input. As an example, a caller may say "operator" or press zero. The response chain would contain a transfer action to pass the caller off to the operator. If the caller asks about product information, the response chain could contain a goto action to move the caller to a module, which would ask, for example, what product they are interested in. Actions allowed may include, for example, vox, goto, listen (in a multilevel module), transfer or hangup.

An additional type of execution chain 396 is a confirmation execution chain. When there is some doubt about the caller's input, a confirmation chain can contain vox actions to elicit a yes/no response to confirm the input. The confirmation chain is considered to have a hidden listen action at the end of the chain. The grammar for this listen action is typically found in the global yes/no module. Actions allowed include, for example, vox.

A phrase 394 can hold text or numbers to represent the possible inputs the caller may make. "Operator" or #0 would be valid examples of caller inputs. A concept 392 can hold multiple phrases that fit under an umbrella identifier. For example, the concept "operator" may contain the phrases "operator", #0 and "front desk". All of these possible inputs would yield the same result and therefore are placed under the concept "operator."

A vocabulary item can contain a primary concept and one or more secondary concepts. In some embodiments, the secondary concepts are only utilized in the natural language module. In other modules that accept input from the caller, the vocabulary item and concept have a one to one relationship. When secondary concepts are present, it is the combination of the primary and secondary concepts that identifies the proper response chain to execute. An example of two vocabulary items each with a primary concept and multiple secondary concepts is as follows:

Primary: Directions
Secondary 1: Downtown
Secondary 2: Valley
Primary: Fax Number
Secondary 1: Corporate headquarters
Secondary 2: Downtown
Secondary 3: Valley Certain embodiments of the grammar 390 can contain the appropriate responses the caller should make at a given time. The grammar 390 is identified by a listen action. The grammar can contain one or more vocabulary items.

A module 388 is designed to handle one portion of a call flow. For example, this may be a greeting, asking whom the caller would like to speak to, what they would like to know, asking multiple questions to achieve a specific goal. This may be accomplished by performing various actions at the appropriate times.

The goto module is so named because the main chain's final action can be a goto action. Other valid actions in the main chain are vox actions. This module typically does not receive input from the caller. It is an appropriate place to provide information before moving on in the call flow. Like the goto module, the hangup module gets its name from being the last action in its main chain. In some embodiments, the last action in the transfer module is a transfer action.

In some embodiments, the list module is the standard caller input module. The last action in the main chain of this module is the listen action. The caller is directed to respond in a specific fashion, either by pressing buttons or speaking words. The module is designed with response execution chains to move the caller along in the call flow based on the input the caller provides. The other chains no input, no match and confirmation chains providing support in accomplishing this goal.

The natural language module is typically the same as the list module except that each vocabulary item can have one or more secondary responses to allow more natural input from the caller. Taking the example above:

Primary: Directions
    Secondary 1: Downtown
    Secondary 2: Valley
Primary: Fax Number
    Secondary 1: Corporate headquarters
    Secondary 2: Downtown
    Secondary 3: Valley The caller may say, for example: "I need directions to the downtown location." The words "downtown" and "directions" are identified and the appropriate response chain is executed. This naturally assumes that the phrase "downtown" has been specified in the downtown concept and the same is true with the phrase "directions" and its associated concept.

The overview module is typically the same as the list module except that the overview module keeps track of where the caller interrupted a vox action. If the response chain for the input only contains vox actions, the module will pick up where the caller interrupted the vox actions in the main chain. Normally the main chain would start over from the beginning with this scenario.

The yes/no module is typically the same as the list module except that the yes/no module's main chain's listen action's grammar automatically contains the concepts "yes" and "no". These concepts may pull their phrases for the concepts "yes" and "no" from the global yes/no module.

The multilevel module is typically the same as the list module except that the multilevel module allows multiple questions to be asked in the same module. This is accomplished by allowing multiple main execution chains. Each main execution chain represents one question in a multiple part question. Each response chain may have one listen action that will link to the appropriate grammar for the next question:

As an example:

| MAIN 1 | |
| --- | --- |
| Actions: | VOX - "What state do you live in?" |
| | LISTEN - Associates with the grammar containing the 50 United States. |
| | Determines user has selected state X. |
| RESPONSE X | |
| Actions | VOX - "What city in X do you live in" |
| | LISTEN - Associates with the grammar containing valid cities in state X. |
| | Determines user has selected city Y. |
| MAIN 2 | |
| Actions | LISTEN - Associates with a grammar with the concept Start Over |
| *-continued* | |
| RESPONSE X + Y | |
| Actions | VOX - "Here is the information for" X + Y |
| RESPONSE Start Over | |
| Actions | GOTO - Associates with this module, allowing the caller to start the series over. |

In this example, the response actions may be combined with the actions of the next main execution chain to provide the resulting voxes and grammars specified by the listen actions in the two chains. The main chain's listen grammar's concepts are considered global to the next question, hence the response chain was "Start Over" not X+"Start Over". On a case by case basis, the main chain's listen grammar's concepts can be overloaded. If concept Xn overloads "Start Over," a Xn+"Start Over" response chain will be produced. This results in a response Xn+"Start Over" being used when Xn was the input for the first question. Other X concepts will still utilize the response Start Over if that is the input given on the second question.

In certain embodiments, the global yes/no module contains global "yes" and "no" concepts. The phrases defined under these concepts are utilized in the yes/no modules. The confirmation chains utilize this grammar when confirming their input. The main chain may contain a listen action. No goto action may move the caller to this module. The no input and no match chains defined in this module may be utilized as default chains for the confirmation chain and the yes/no modules.

The concepts defined in the global module can be used by other modules. This allows certain concepts to be available to the caller throughout the call flow. The no input and no match chains defined in this module may be utilized as default chains for modules throughout the call flow.

Figure 4:
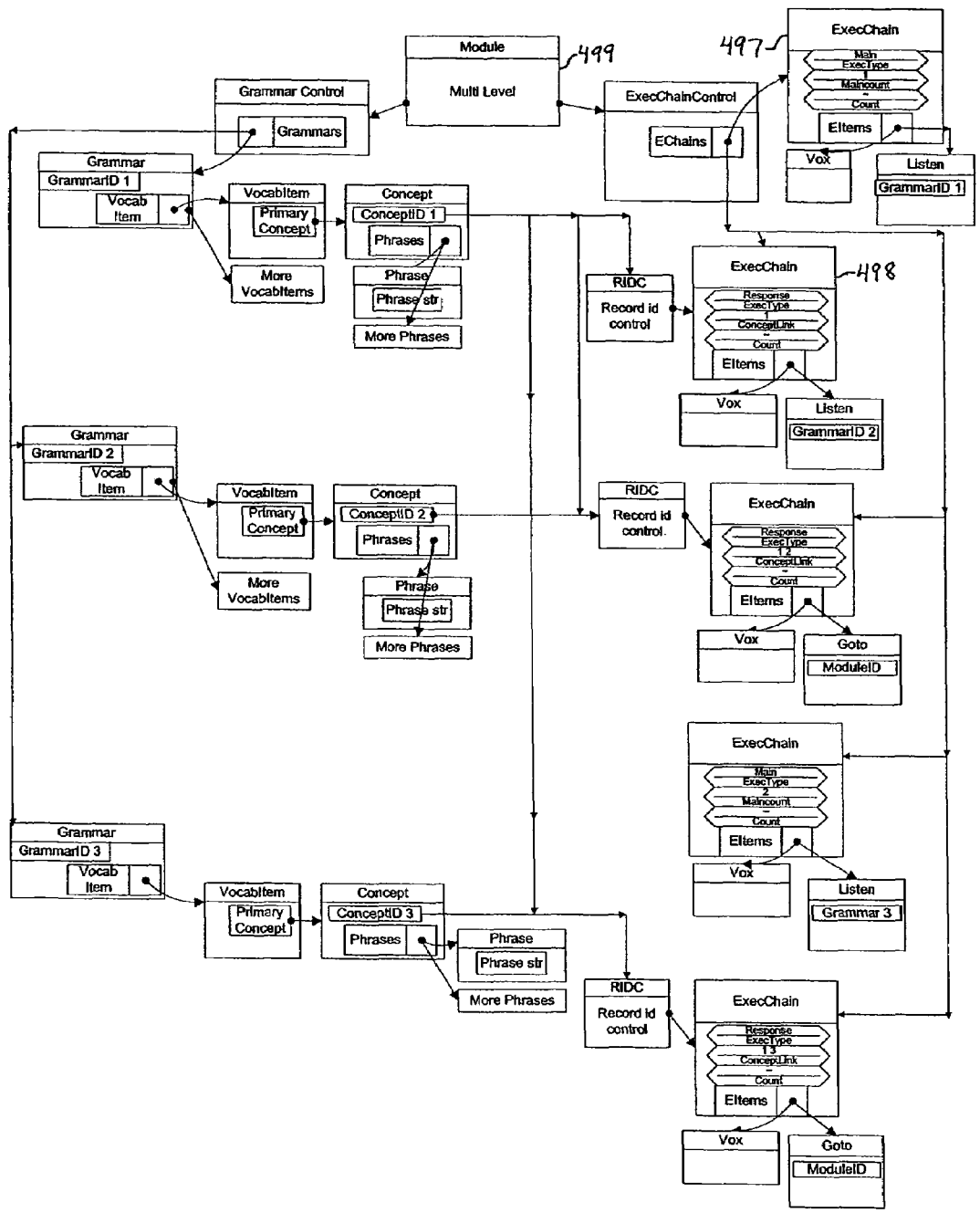
FIG. 4 is a diagram of one example of a multilevel module that can be devised utilizing the call flow object model.

FIG. 4 is a diagram of one example of a multilevel module 499 that can be devised utilizing the call flow object model. In the example of FIG. 4, multiple execution chains are shown. For example, a main type execution chain 497 is shown, as is a response type execution chain 498. Actions are also shown in conjunction with the execution chains, for example, vox, listen and goto actions. In addition, multiple grammars, vocabulary items, concepts and phrases are illustrated in this example. Of course, FIG. 4 shows just one example of a multilevel module that can be devised. Many other examples are also possible depending on the needs and preferences of the designers or users.

Figure 5:
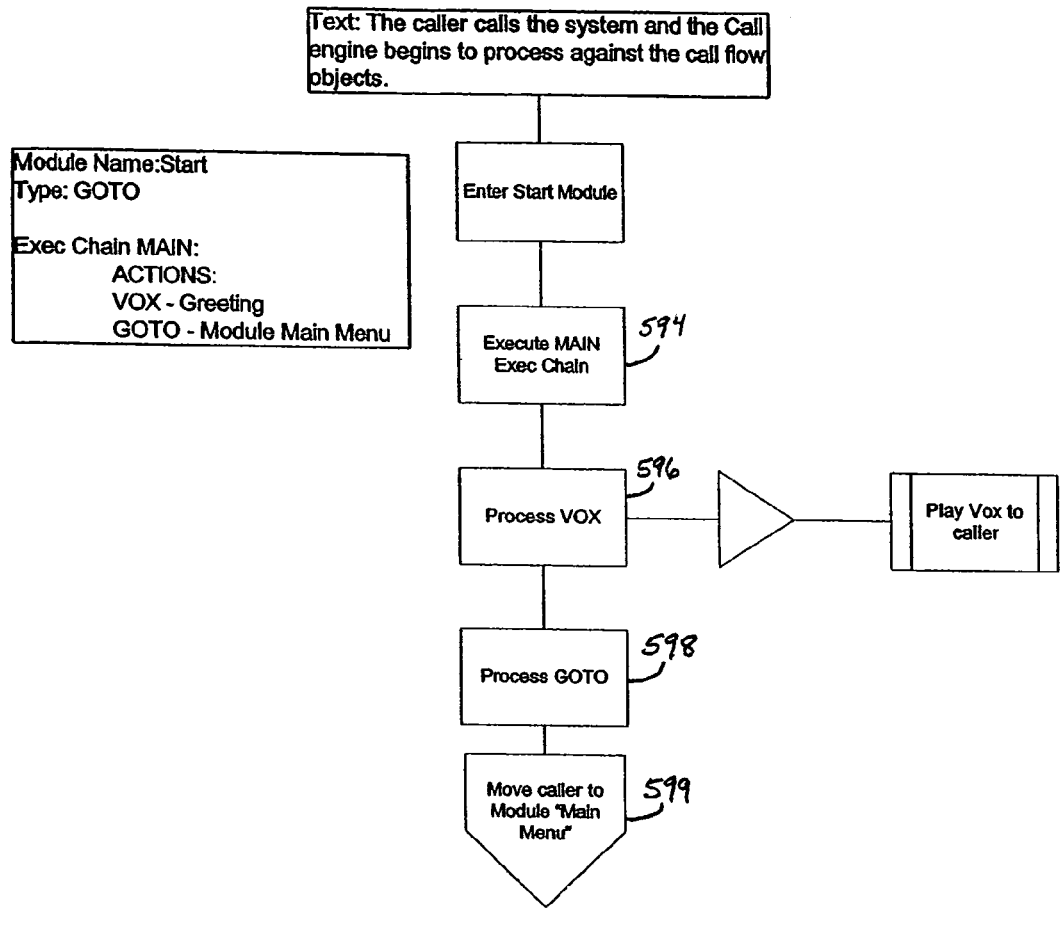
FIG. 5 is a flowchart illustrating an example of a call flow design that can be devised utilizing the call flow objects as described above.

FIG. 5 is a flowchart illustrating an example of a call flow design that can be devised utilizing the call flow objects as described above. In the example in FIG. 5, a start module 592 is devised, in which a main execution chain is executed in block 594, a vox action is processed in block 596, and a goto action is processed in block 598. At block 599, the caller is moved to a main menu module. Certain embodiments of the main menu module are shown in the example of FIG. 6 below.

Figure 6:
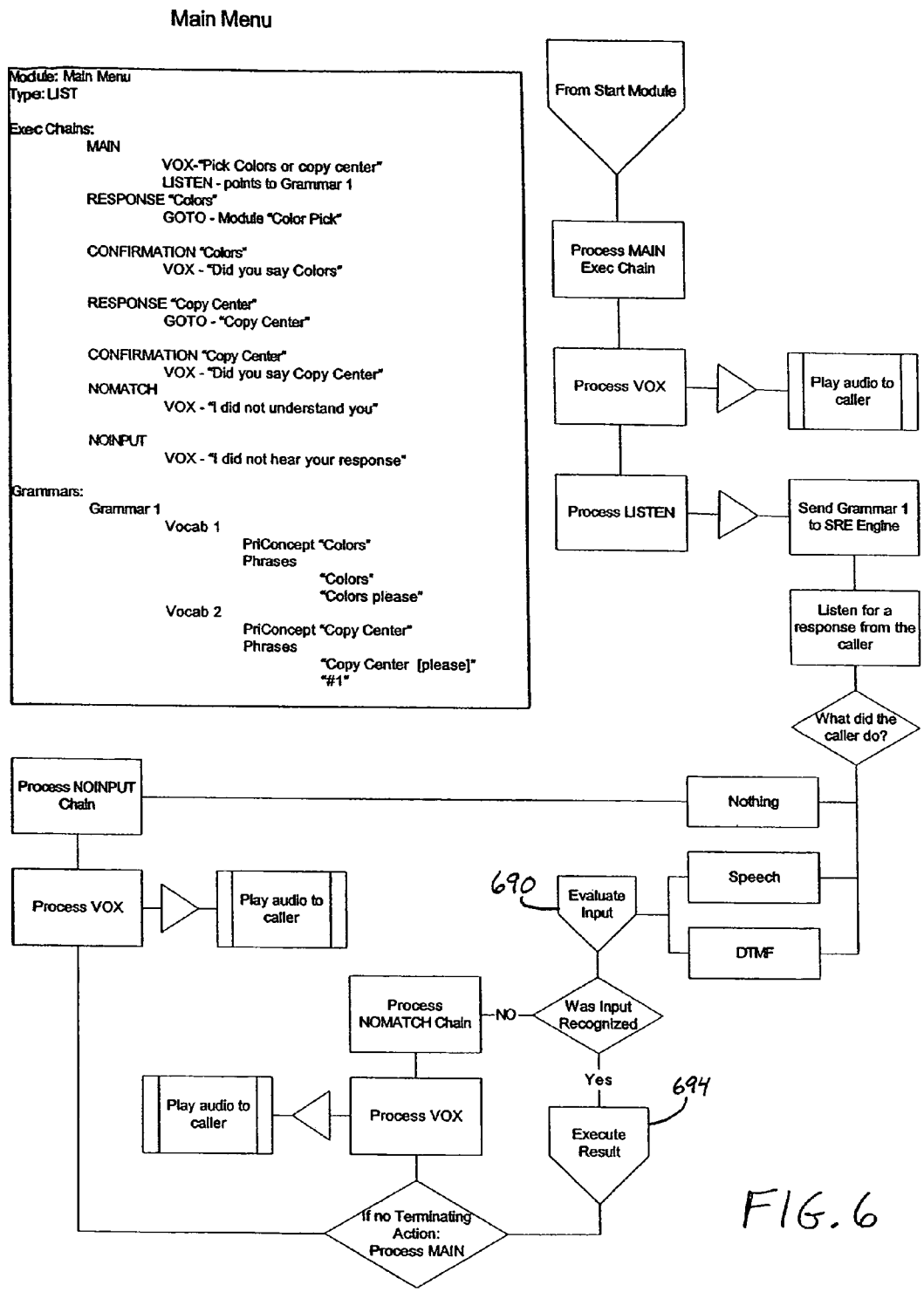
FIG. 6 is a flowchart illustrating an example of the call flow design for the main menu module referred to in FIG. 5.

FIG. 6 is a flowchart illustrating an example of the call flow design for the main menu module referred to in FIG. 5. This example of the main menu module includes the main, response, confirmation, response, no match and no input execution chains. In addition, the grammar labeled as Grammar 1 is shown having two vocabularies. The two vocabularies are labeled as Vocab 1 and Vocab 2 in FIG. 6, and each have a primary concept and several phrases defined. The example in FIG. 6 includes an evaluate input block 690, which is illustrated in greater detail below with regard to FIG. 7, and an execute result block 694, which is illustrated in greater detail below with regard to FIG. 8.

Figure 7:
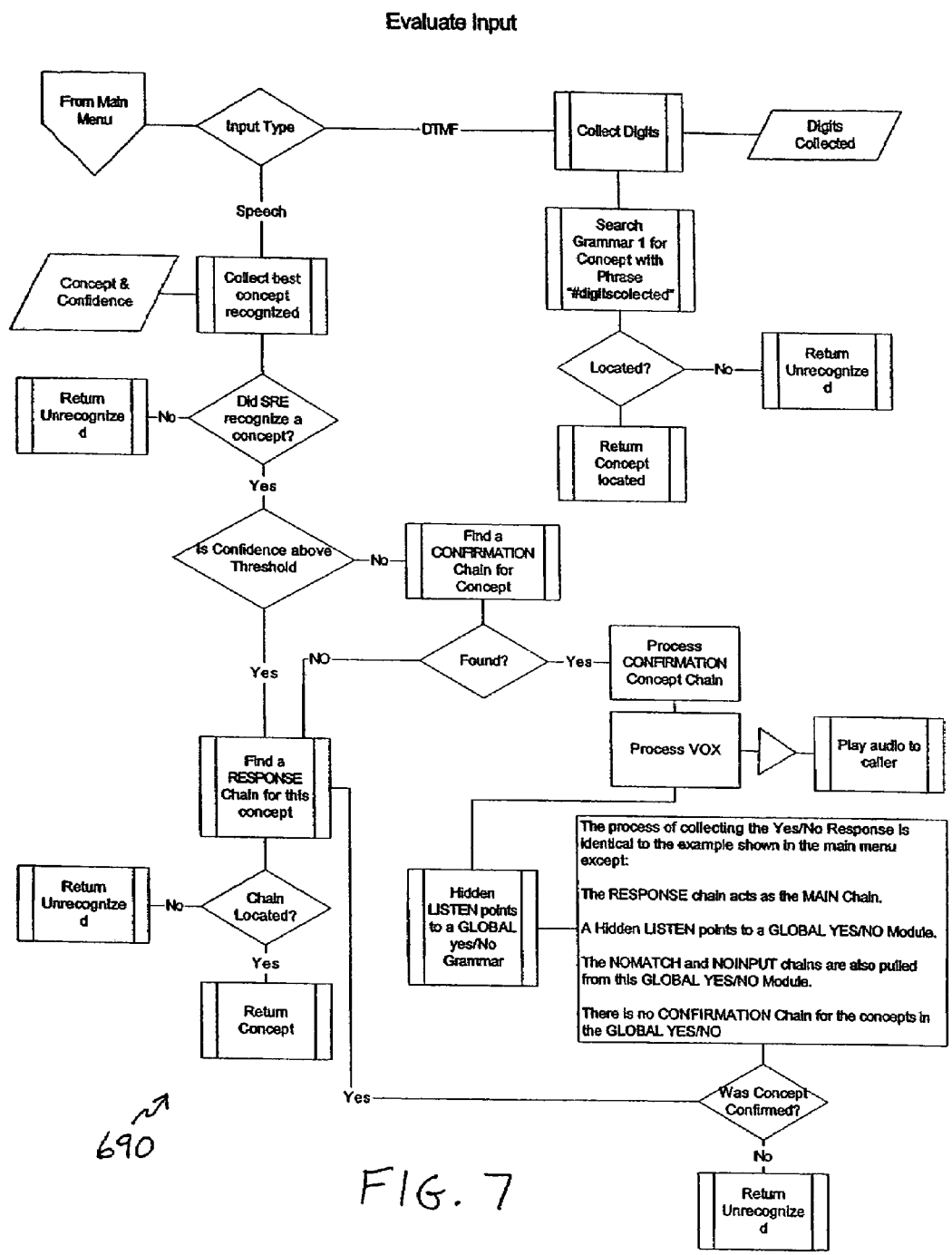
FIG. 7 is a flowchart illustrating an example of the call flow design for the evaluate input block shown in FIG. 6.

FIG. 7 is a flowchart illustrating an example of the call flow design for the evaluate input block 690 shown in FIG. 6. FIG. 7 shows the detailed operational flow of some embodiments of the evaluate input block 690.

Figure 8:
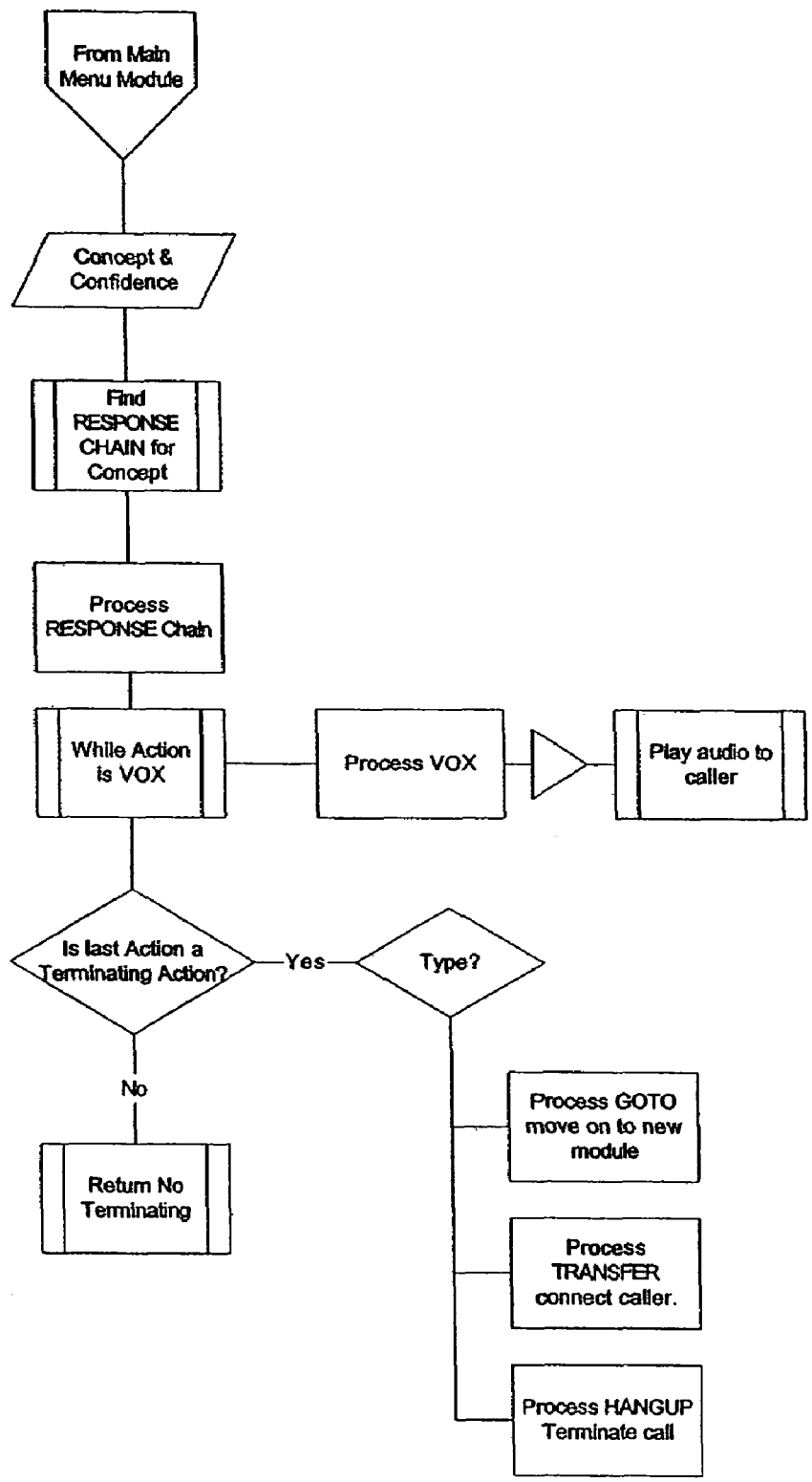
FIG. 8 is a flowchart illustrating an example of the call flow design for the execute result block shown in FIG. 6.
Figure 3:
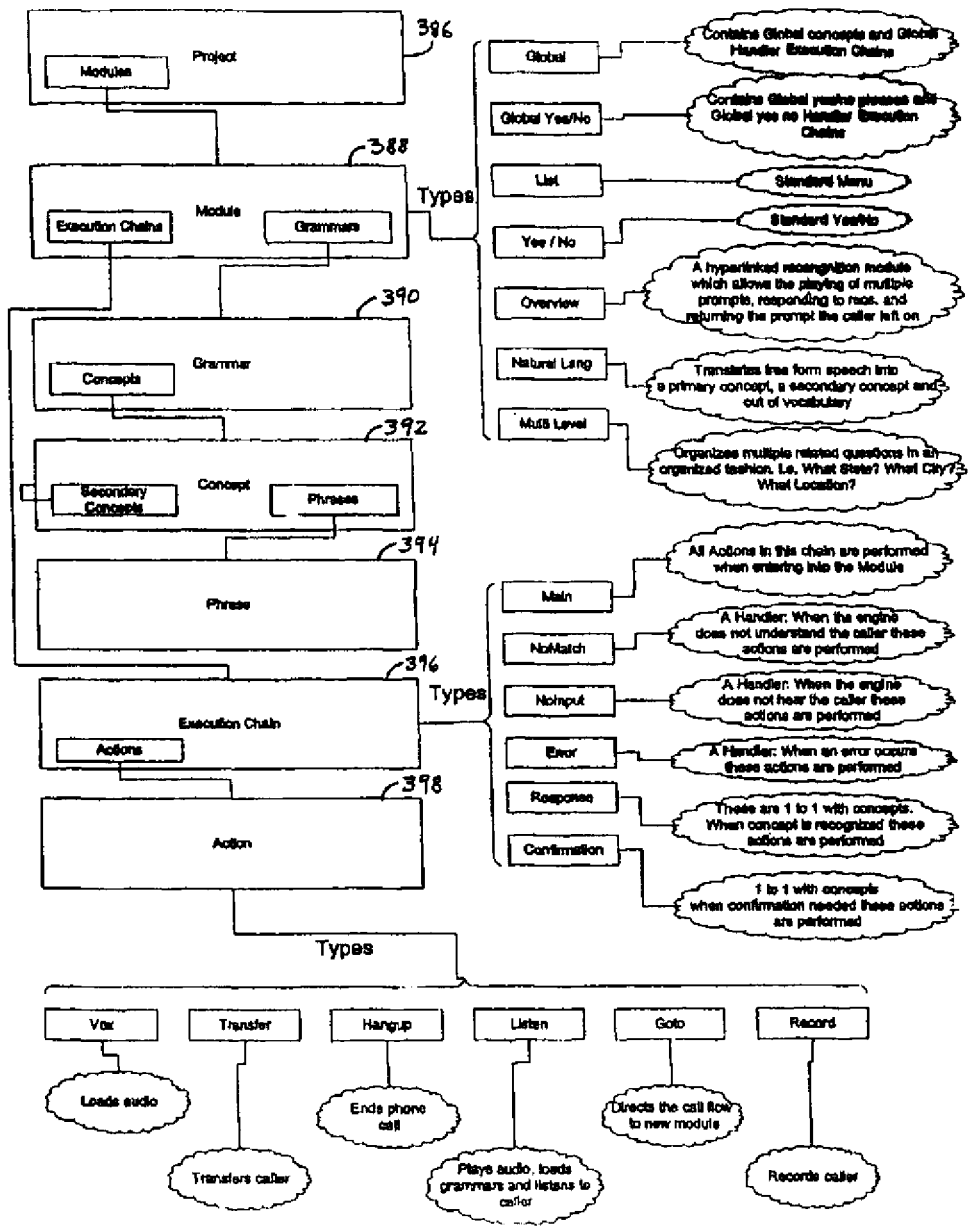
Figure 7A:
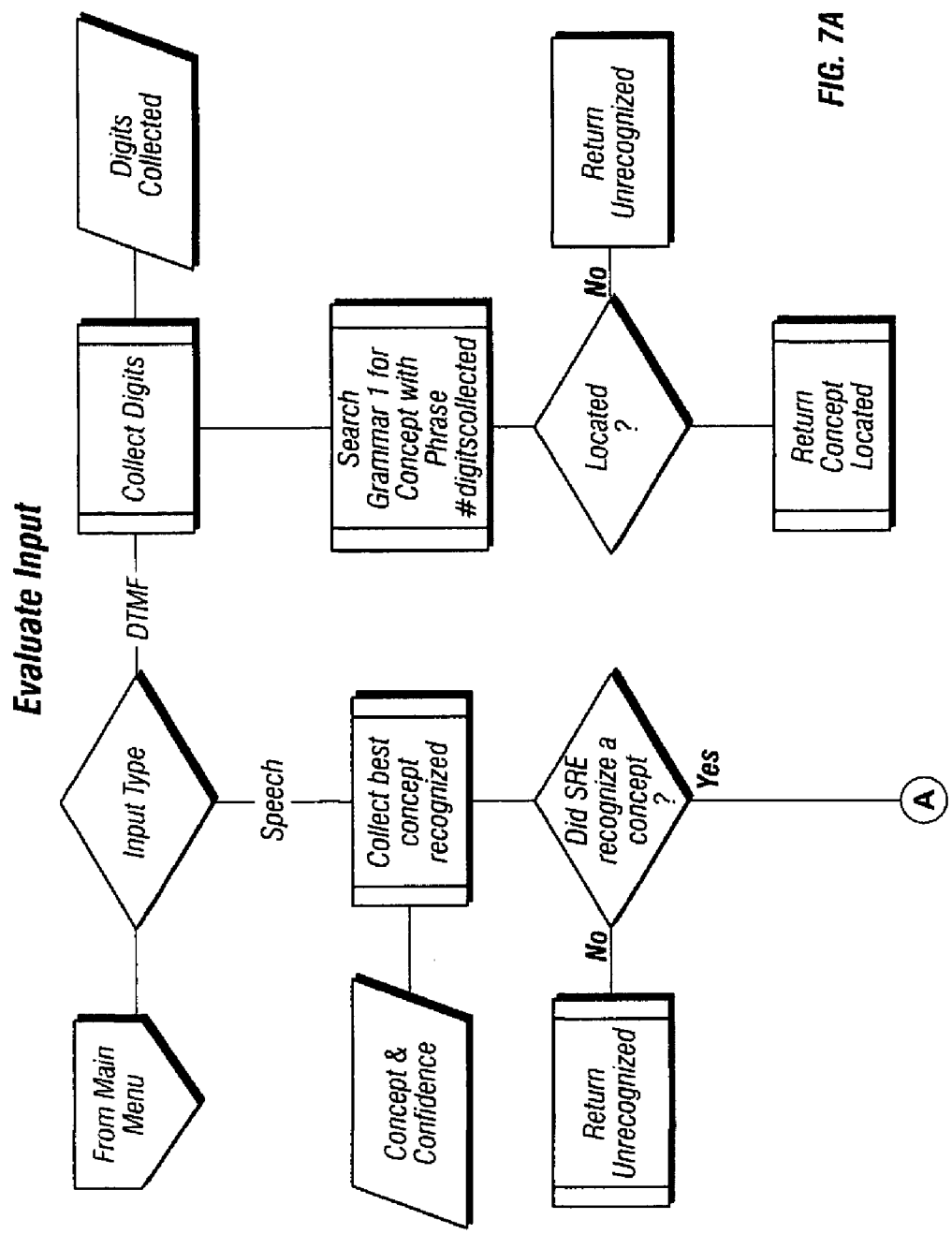
Figure 7B:
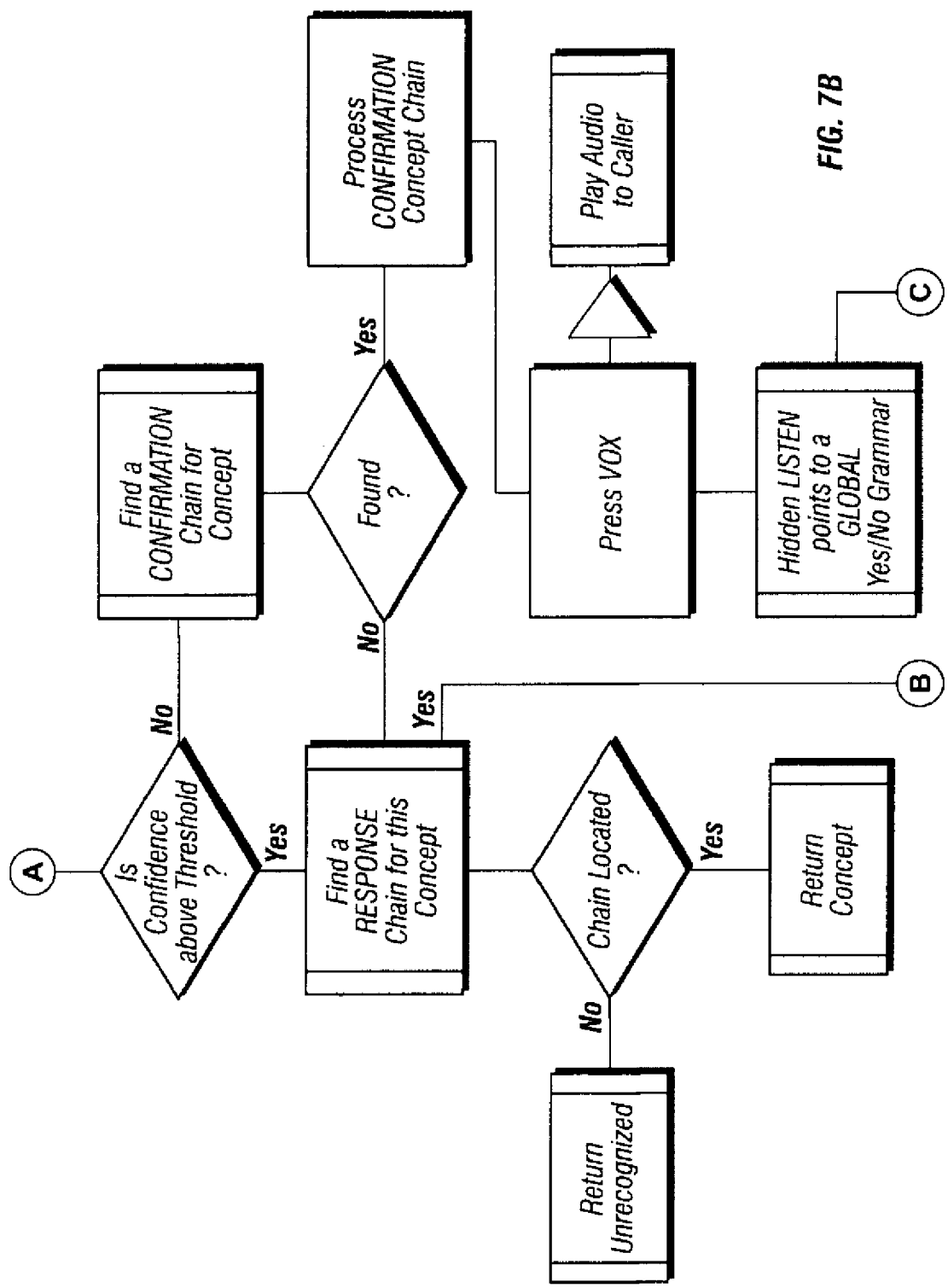
Figure 7C:
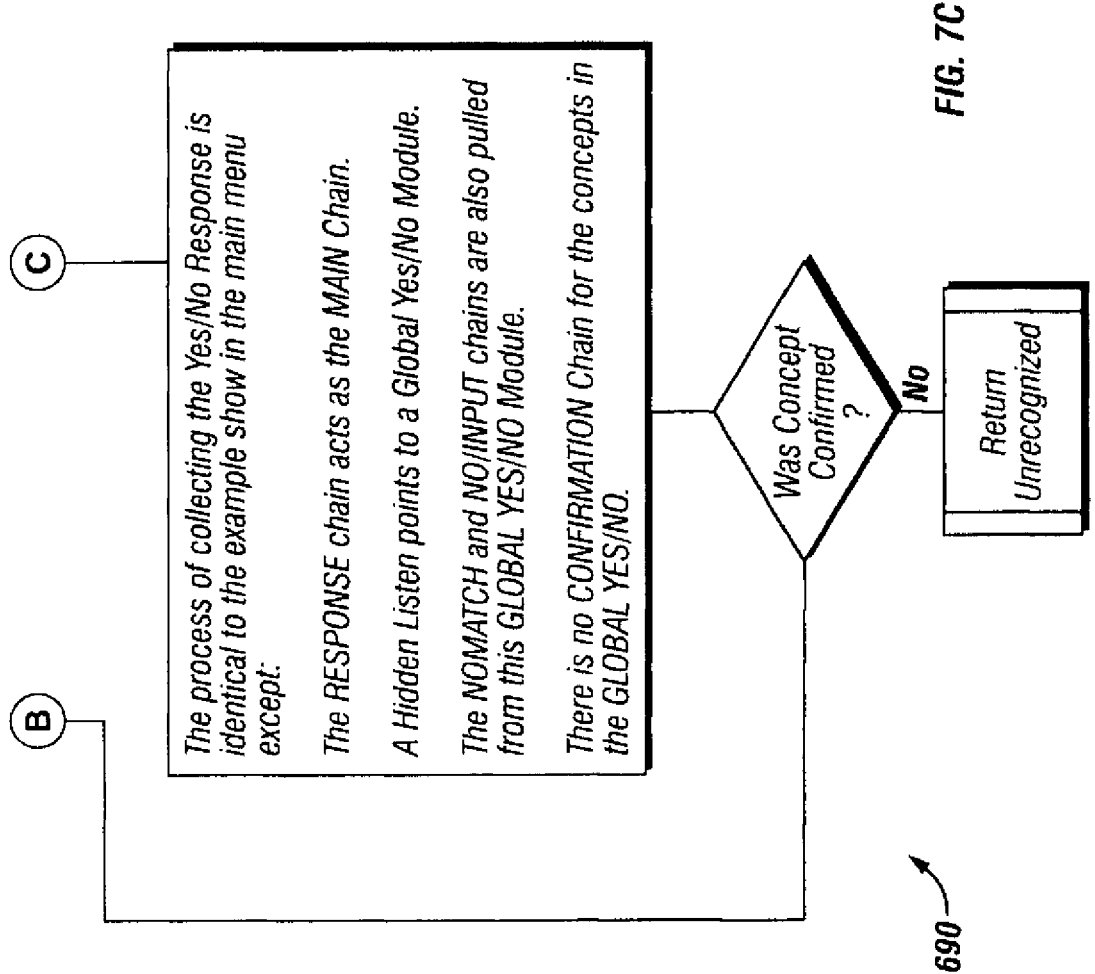

FIG. 8 is a flowchart illustrating an example of the call flow design for the execute result block 694 shown in FIG. 6. FIG. 8 shows the detailed operational flow of some embodiments of the execute result block 694.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention.

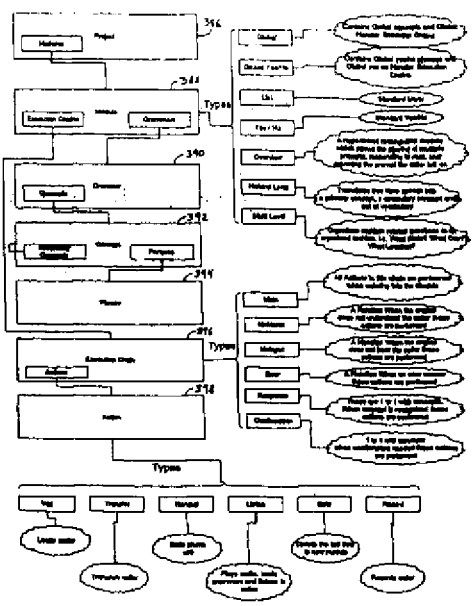

What is claimed is:

1. A method of designing a call flow in a speech recognition system, the method comprising:

organizing and utilizing a multiple question directed dialog in the speech recognition system;

organizing and utilizing a natural language directed dialog in the speech recognition system; and organizing and utilizing an overview dialog in the speech recognition system, wherein the natural language directed dialog comprises a primary concept and a secondary concept.

2. A method of designing a call flow in a speech recognition system, the method comprising:

organizing and utilizing a multiple question directed dialog in the speech recognition system;

organizing and utilizing a natural language directed dialog in the speech recognition system; and organizing and utilizing an overview dialog in the speech recognition system, wherein the natural language directed dialog comprises a primary concept and a secondary concept without requiring a structured response.

3. A speech recognition system having a plurality of modules for implementing a call flow, the speech recognition system comprising:

at least one global module defining concepts that are available to a caller in a plurality of places in a call flow; and at least one user-defined module that processes at least a portion of the call flow, wherein at least one user-defined module is a natural language module comprising primary and secondary responses to process natural language input from the caller.

4. The speech recognition system of claim 3, wherein the speech recognition system includes at least two user-defined modules, wherein one of the user-defined modules is a list module comprising a standard caller input module.

5. The speech recognition system of claim 3, wherein the speech recognition system includes at least two user-defined modules, wherein one of the user-defined modules is an overview module that continues after an interruption in the call flow where the interruption occurred.

6. The speech recognition system of claim 3, wherein the speech recognition system includes at least two user-defined modules, wherein one of the user-defined modules is a multilevel module that allows multiple questions to be asked by a caller in the same module.

7. The speech recognition system of claim 3, further comprising an execution chain that provides actions that are performed in response to input by the caller.

8. The speech recognition system of claim 7, wherein the execution chain is a main execution chain.

9. The speech recognition system of claim 7, wherein the execution chain is one or more of the following: a no match execution chain, a no input execution chain, an error execution chain, a response execution chain, a confirmation execution chain.

* * * * *

UNITED STATES PATENT AND TRADEMARK OFFICE
CERTIFICATE OF CORRECTION

PATENT NO. : 7,359,860 B1
APPLICATION NO. : 10/789397
DATED : April 15, 2008
INVENTOR(S) : Edward S. Miller It is certified that error appears in the above-identified patent and that said Letters Patent is hereby corrected as shown below:

The title page showing the illustrative figure should be deleted to be replaced with the attached title page.

The drawing sheet, consisting of Figs. 3 and 7, should be deleted to be replaced with the drawing sheet, consisting of Figs. 3, 7A, 7B, 7C, as shown on the attached pages.

Signed and Sealed this

Seventeenth Day of November, 2009

David J. Kappos
*Director of the United States Patent and Trademark Office*

(12) United States Patent
Miller et al.

(10) Patent No.: US 7,359,860 B1
(45) Date of Patent: Apr. 15, 2008

(54) CALL FLOW OBJECT MODEL IN A SPEECH RECOGNITION SYSTEM

(75) Inventors: Edward S. Miller, San Diego, CA (US); Kyle N. Danielson, San Diego, CA (US); James F. Blake, II, San Diego, CA (US); Michael D. Bergman, Poway, CA (US); Sidney Schipper, San Diego, CA (US)

(73) Assignee: Lumen Vox, LLC, San Diego, CA (US)

( * ) Notice: Subject to any disclaimer, the term of this patent is extended or adjusted under 35 U.S.C. 154(b) by 846 days.

(21) Appl. No.: 10/789,397

(22) Filed: Feb. 27, 2004

Related U.S. Application Data

(60) Provisional application No. 60/451,353, filed on Feb. 27, 2003.

(51) Int. Cl.
*G10L 15/00* (2006.01)

(52) U.S. Cl. .................. 704/275; 704/270; 379/88.05
(58) Field of Classification Search ............... 704/270, 704/275; 379/88.05, 88.1
See application file for complete search history.

(56) References Cited

U.S. PATENT DOCUMENTS

| | | |
|---|---|---|
| 5,384,892 A | 1/1995 | Strong |
| 5,390,278 A | 2/1995 | Gupta et al. |
| 5,615,296 A | 3/1997 | Stanford et al. |
| 5,649,057 A | 7/1997 | Lee et al. |
| 5,719,921 A | 2/1998 | Vysotsky et al. |
| 5,774,628 A | 6/1998 | Hemphill |
| 5,867,817 A | 2/1999 | Catallo et al. |
| 6,006,185 A | 12/1999 | Immarco |
| 6,173,266 B1 * | 1/2001 | Marx et al. .............. 704/270 |
| 6,263,308 B1 | 7/2001 | Heckerman et al. |
| 6,298,324 B1 | 10/2001 | Zuberec et al. |
| 6,321,198 B1 * | 11/2001 | Hank et al. .............. 704/270 |
| 6,377,921 B1 | 4/2002 | Bahl et al. |
| 6,975,985 B2 | 12/2005 | Kriechbaum et al. |
| 2002/0095295 A1 | 7/2002 | Cohen et al. |
| 2002/0136378 A1 | 9/2002 | Strubbe et al. |
| 2002/0193990 A1 | 12/2002 | Komatsu |
| 2005/0091057 A1 * | 4/2005 | Phillips et al. .......... 704/270.1 |

* cited by examiner

*Primary Examiner*—Daniel Abebe
(74) *Attorney, Agent, or Firm*—Knobbe Martens Olson & Bear LLP

(57) ABSTRACT

Systems and methods are provided for embodiments of a speech recognition system call flow object model. The systems and methods organize and execute, for example, multiple question directed dialogs, overview dialogs, or natural language directed dialogs. In certain embodiments, the organizing and executing of the natural language directed dialogs uses primary and secondary concepts without requiring a structured response. The systems and methods enable the call flow designers to define particular call flows without requiring the designers to perform any programming or coding.

9 Claims, 8 Drawing Sheets